United States Patent
Duckwitz (10) Patent No.: US 9,718,155 B2
(45) Date of Patent: Aug. 1, 2017

(54) INSULATED HEAT EXCHANGER TUBE ASSEMBLY AND METHODS OF MAKING AND USING SAME

(71) Applicant: Turbotec Products, Inc., Newton, NC (US)

(72) Inventor: Todd A. Duckwitz, Hickory, NC (US)

(73) Assignee: Turbotec Products, Inc., Newton, NC (US)

( * ) Notice: Subject to any disclaimer, the term of this patent is extended or adjusted under 35 U.S.C. 154(b) by 659 days.

(21) Appl. No.: 14/159,215

(22) Filed: Jan. 20, 2014

(65) Prior Publication Data

US 2015/0204624 A1  Jul. 23, 2015

(51) Int. Cl.
| | | |
|---|---|---|
| *F28D 7/14* | (2006.01) | |
| *B23P 15/26* | (2006.01) | |
| *F28D 21/00* | (2006.01) | |

(52) U.S. Cl.
CPC ............... *B23P 15/26* (2013.01); *F28D 7/14* (2013.01); *F25B 2339/047* (2013.01); *F28D 2021/0068* (2013.01); *F28F 2270/00* (2013.01); *Y10T 29/4935* (2015.01)

(58) Field of Classification Search
CPC ......... F16L 59/14; F16L 59/143; F16L 59/15; F16L 59/153; F16L 59/147; F16L 59/02; F25D 2201/10; F25D 2201/126; F25D 2201/1262; F25D 2201/128; Y02B 40/34; F28F 2270/00; B23P 15/26; F28D 7/14; F28D 2021/0068; F25B 40/00; Y10T 29/4935
USPC ........................................ 137/149; 165/136
See application file for complete search history.

(56) References Cited

U.S. PATENT DOCUMENTS

| | | | | | |
|---|---|---|---|---|---|
| 3,130,564 | A | * | 4/1964 | Cronelid ................. | F25B 33/00 62/476 |
| 3,269,422 | A | * | 8/1966 | Matthews ............ | B67D 1/0867 138/111 |
| 3,415,288 | A | * | 12/1968 | Marshack ............. | F16L 59/029 138/141 |
| 3,504,505 | A | * | 4/1970 | Spencer .................. | F17C 3/085 62/6 |
| 3,552,445 | A | * | 1/1971 | Andrews ............... | F16L 59/143 138/144 |
| 4,194,536 | A | * | 3/1980 | Stine ..................... | F16L 59/145 138/103 |
| 4,570,680 | A | * | 2/1986 | Ratti ...................... | F16L 9/147 138/149 |

(Continued)

OTHER PUBLICATIONS

Smart Foam Interior Foam Insulation Product Information Sheet, 2 pages (internet publication).

(Continued)

*Primary Examiner* — Tho V Duong
(74) *Attorney, Agent, or Firm* — Alix, Yale & Ristas, LLP (57) ABSTRACT

An insulated heat exchanger tube assembly is disclosed herein comprising a heat exchanger tube, an insulating portion form-fitted around the heat exchanger tube, the insulating portion comprising a polymeric foam, and a polymeric film formed over and adhered to the insulating portion. A heat exchanger formed from the tube and a method of forming an insulated heat exchanger tube also are disclosed. The tube assembly is useful in making a heat exchanger that requires minimal floor space and can be efficiently assembled.

15 Claims, 6 Drawing Sheets

(56) References Cited

U.S. PATENT DOCUMENTS

| | | | |
|---|---|---|---|
| 5,637,827 A | 6/1997 | Goch | |
| 5,725,028 A * | 3/1998 | Cleland | F16L 9/20 |
| | | | 138/111 |
| 6,823,899 B2 * | 11/2004 | Weibel | F16L 59/02 |
| | | | 138/111 |
| 7,173,069 B2 | 2/2007 | Swennen | |
| 7,862,870 B2 | 1/2011 | Gavin et al. | |
| 7,959,103 B2 | 6/2011 | Cocciadiferro et al. | |
| 8,122,946 B2 | 2/2012 | Daly et al. | |
| 8,430,147 B2 | 4/2013 | Greenwood et al. | |
| 8,465,404 B2 | 6/2013 | Hadley | |
| 8,544,689 B2 | 10/2013 | Bertram et al. | |
| 8,627,637 B2 | 1/2014 | Greenwood et al. | |
| 2010/0031954 A1 * | 2/2010 | Blevins | F24J 2/34 |
| | | | 126/640 |
| 2013/0047551 A1 | 2/2013 | Jones | |
| 2013/0047552 A1 | 2/2013 | Cocciadiferro | |
| 2013/0047554 A1 | 2/2013 | Bertram et al. | |
| 2013/0047560 A1 | 2/2013 | Wetsch et al. | |

OTHER PUBLICATIONS

Smart Foam Insulation, The Superior Insulation for New and Retrofit Applications, 2 pages (internet publication).
Smart Foam Insulation, Material Safety Data Sheet, 3 pages (internet publication).
HexWrap, Heat Exchanger Insulation, 4 pages (internet publication).
Intellipack, Intellipack Smartmold Pre-Mold, 3 pages (internet publication).

* cited by examiner

INSULATED HEAT EXCHANGER TUBE ASSEMBLY AND METHODS OF MAKING AND USING SAME

BACKGROUND

Heat exchanger tubes can be coiled to permit a substantial length of tubing material to be conveniently disposed within the confines of a heat exchanger housing. When the tubes are used in connection with hot and/or cold fluid, the tubes may have insulation placed on the outer surface thereof.

Tube-in-tube heat exchangers are used in a variety of applications for transferring heat from one fluid to another. Particular configurations of tube-in-tube heat exchangers are described in U.S. Pat. Nos. 5,004,047 and 6,012,514.

Traditionally, tube-in-tube heat exchangers used in geothermal heat pumps employ coiled tube-in-tube heat exchanger tubes. The coiled tubes are wrapped with an insulating material after the tubing is installed. The insulated material is wrapped and taped around an individual tube, or around a coil of tubing material. This process can be time-consuming, and often is performed by a different contractor than the person who installs and/or maintains the heat exchanger.

It would be useful to further improve the effectiveness of insulated heat exchange tube material, as well as the efficiency of installation.

SUMMARY

One embodiment is an insulated heat exchanger tube assembly comprising a heat exchanger tube, an insulating portion form-fitted around the heat exchanger tube, the insulating portion comprising a polymeric foam, and a polymeric film formed over and adhered to the insulating portion.

Another embodiment is a heat exchanger tube comprising the insulated tube assembly described in the previous paragraph.

A further embodiment is method of making a heat exchanger tube assembly, comprising obtaining a mold having an inner surface, placing a film material on the inner surface of the mold, placing a heat exchanger tube inside the mold, feeding an insulating, foamable material into the mold in liquid form around the heat exchanger tube, and curing the insulating material to form an insulating foam layer that surrounds the heat exchanger tube and adheres to the film material.

Yet another embodiment is a method of making a mold to be used in the process described in the previous paragraph.

DETAILED DESCRIPTION

A new and improved insulated heat exchanger tube assembly has been developed can be efficiently installed and is suitable for use in a small space. The insulated heat exchanger tube assembly is compact in size and is configured for convenient positioning any one of a variety of angles within a heat exchanger. The insulated heat exchanger tube assembly can be used in a variety of types of HVAC units, and is particularly useful for use in heat pumps, including geothermal heat pumps. In embodiments, the tube itself is coiled, and the insulation is applied by molding the foam insulation around the coiled tube. In some cases, the heat exchanger tube has a tube-in-tube configuration.

DEFINITIONS

As used herein, an "insulating portion" refers to a shaped insulated piece of material that provides an insulating function by surrounding a heat exchanger pipe that is configured to contain hot and/or cold fluid. The insulating portion in combination with the outer film layer form an insulating housing. As used herein a "mold" is an enclosure configured to hold a heat exchange pipe and to receive a liquid insulating material that subsequently is cured to form a solid insulating material. The insulating material is a foam.

Figure 8:
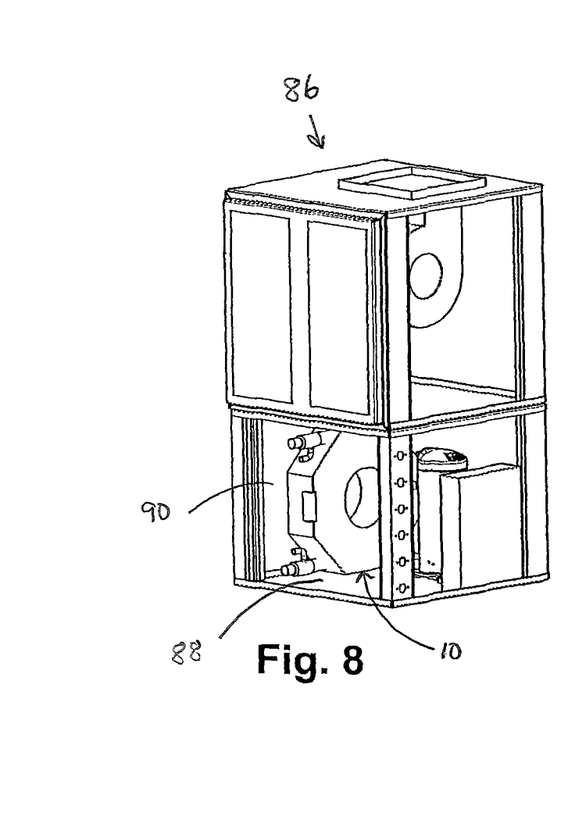
FIG. 8 shows a heating ventilation air conditioning (HVAC) unit containing an insulated heat exchanger tube assembly of FIG. 1
Figure 9:
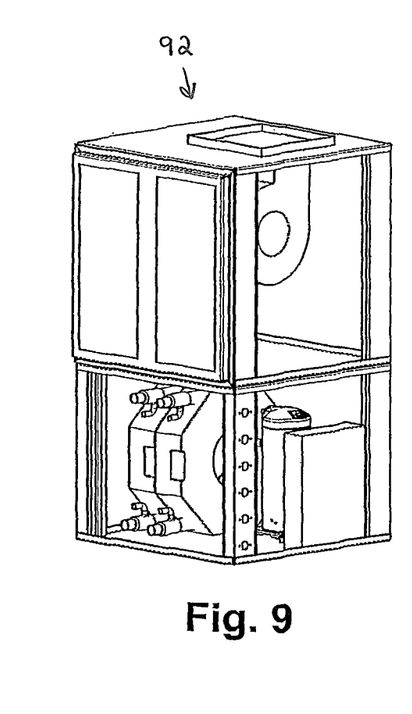
FIG. 9 shows a HVAC unit containing multiple insulated heat exchanger tube assemblies of FIG. 1.
Figure 11:
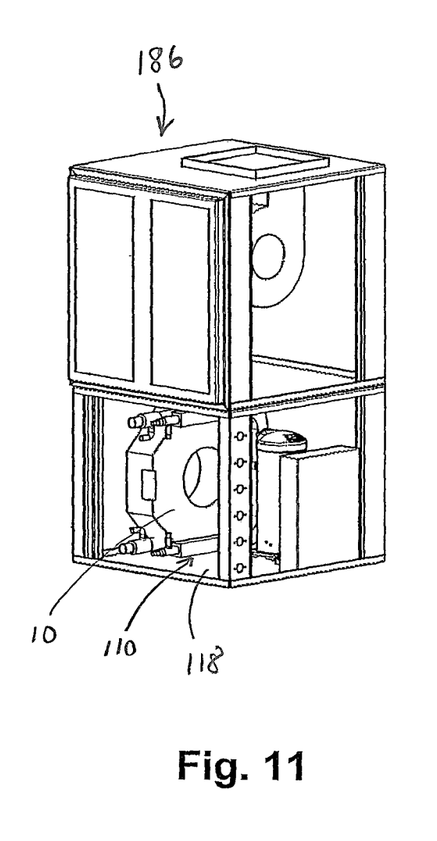
FIG. 11 shows a HVAC unit containing insulated heat exchanger tube assemblies of both FIG. 1 and FIG. 10.

Referring first to FIGS. 1-4, a perspective view of an insulated heat exchanger tube assembly is shown and is designated as 10. The assembly 10 includes a coiled tube 12 having a first end 14 and a second end 16. In the embodiment shown in FIG. 1, the coiled tube 12 has a tube-in-tube configuration with an inner tube 18 and an outer tube 20. However, a single coiled tube also can be used in accordance with embodiments described herein. The coiled portion 13 of the tube 12 is surrounded by an insulation portion 22. The first and second ends 14, 16 of the coiled tube 12 extend outwardly from the insulating portion 22. A film portion 24 surrounds the insulation portion 22. The insulating portion 22 and the film portion 24 together form an insulating housing 26. The insulated housing 26 with the coiled tube therein is portable, and may be installed in a heat exchanger, as is shown in FIGS. 8, 9 and 11, discussed below.

Figure 1:
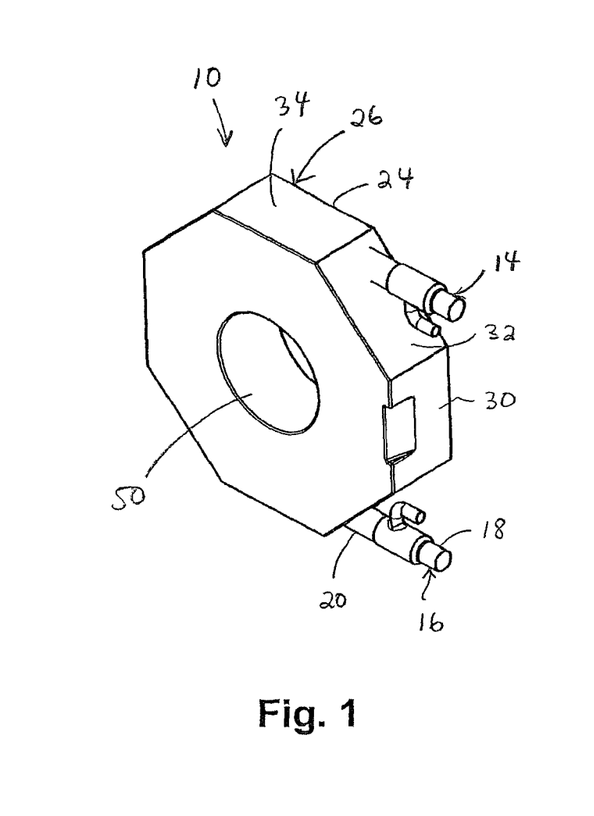
FIG. 1 is a perspective view of an insulated heat exchanger tube assembly in accordance with a first embodiment.
Figure 2:
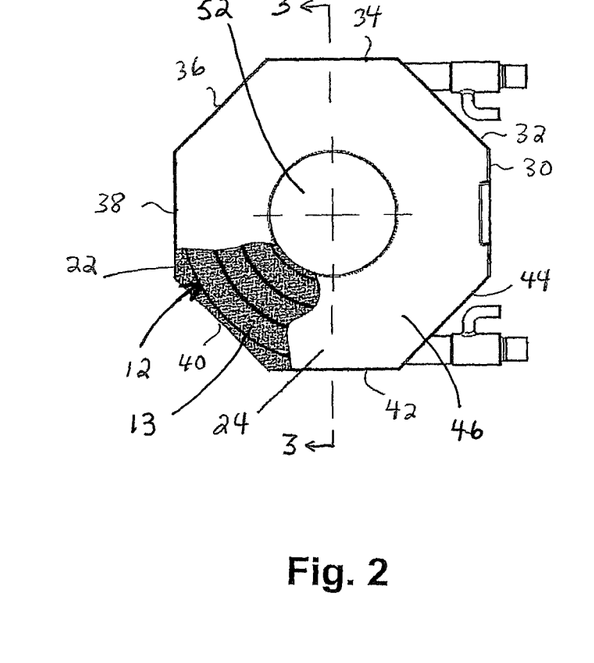
FIG. 2 is a side view of the insulated heat exchanger tube assembly of FIG. 1, partially cut away.
Figure 3:
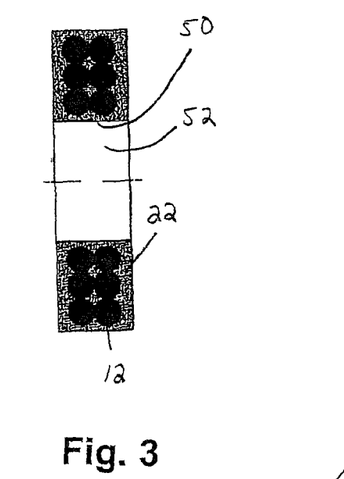
FIG. 3 is a sectional view of the insulated heat exchanger tube assembly of FIG. 1, taken along line 3-3 of FIG. 2.
Figure 4:
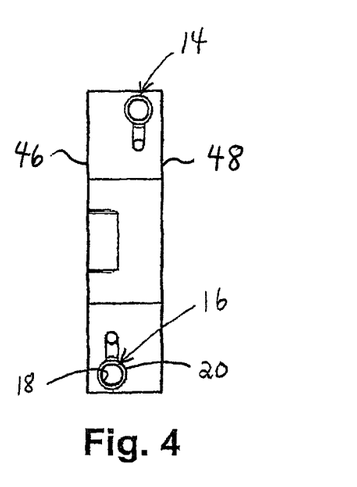
FIG. 4 is an end view of the insulated heat exchanger tube assembly of FIG. 1.

In the embodiment shown in FIG. 1, the insulating portion 22 covered by the film 24 has an eight-sided "donut" shape defined by eight outer side walls 30, 32, 34, 36, 38, 40, 42 and 44, a flat front wall 46, and opposite flat back wall 48, and an annular central wall 50 defining a central opening 52. In other embodiments, there is no central opening, and/or there are more or fewer than eight side walls. In embodiments, the outer surface of the insulated portion is donut-shaped with a curved outer wall and either flat or curved front and back walls. Selection of configuration may depend, in part, upon the thickness, length and shape of the coiled tube being insulated. As is shown in FIGS. 2, 3 and 9, the insulating portion 22 of the insulated housing 26 supports the plurality of coils that form the coiled portion 13 of tube 12 in a fixed position within the insulated housing 26.

When a tube-in-tube heat exchange tube is used in the assembly, the outer tube 20 typically, but not necessarily, is formed from a first type of thermoplastic or thermoset polymer or a metal. Suitable metals include, but are not limited to, steel, copper or an alloy of copper and nickel, and the inner tube 18 preferably, but not necessarily, is formed from a second type of material, such as copper, an alloy of copper and nickel, titanium or a titanium alloy. In embodiments the outer tube 20 comprises carbon steel and the inner tube 18 comprises copper with or without nickel included. In embodiments, the inner tube has a diameter in the range of about 1/8 inch to 3 feet, or 1/2 inch to 1 foot, or 1/2 inch to 1.5 includes. In embodiments, the outer tube has a diameter in the range of about 1/8 inch to 3 feet, or 1/2 inch to 1 foot, or 1/2 inch to 1.5 includes. The inner tube is made from a material that is resistant to corrosion by the fluids that flow on both sides of the tube wall. The inner tube 18 can have a smooth or twisted (fluted) configuration, or can have other heat transfer enhancements. The outer tube 20 is made of a material that is resistant to corrosion by the fluid that flows in the annular opening 52.

The film portion 24 surrounding the insulation is applied during the molding process. The film typically is a flexible polymeric thermoplastic or thermoset material having a thickness in the range of 0.3-50 mils, or 0.5-5 mils. In embodiments, the film is polyethylene, such as low density polyethylene or high density polyethylene. The film has a sufficient high melt temperature that it will remain contiguous with itself during the molding process. The film is sufficiently thin that it conveniently can be folded and creased to conform to the shape of the mold cavity.

The insulating portion 22 is formed from a thermoplastic or thermoset polymeric foam material. Non-limiting examples of suitable foam materials include polyurethanes, polyvinylchlorides, polystyrenes and polyimides. In embodiments, the insulating material has a density in the range of about 0.4-2.0 lb/ft3, or 0.8-1.2 lb/ft3, and an appropriate insulating R factor that typically, but not necessarily, is in the range of 2-30, depending on the material and the thickness used. The foam is formed over the heat exchanger tube by molding using a process described below. Because foaming takes place when the foam surrounds the tube, the foam is form-fitted around the tube outer surface, and fills the space between adjacent coils. Upon curing, the foam adheres to the film. In embodiments, the foam also adheres to the heat exchanger pipe. In embodiments, a two-part polyurethane system is used in which an isocyanate (component A) and a polymeric resin that will react with the isocyanate (component B), such as a polyol, are dispensed from separate vessels into a mixing nozzle, which is then used to spray the liquid mixture into the mold. In certain embodiments, the octagonal assembly has a length in the range of 4 inches to 5 feet, a width in the range of 4 inches to 5 feet, and a thickness in the range of 1/2 inch to 5 feet.

Figure 5:
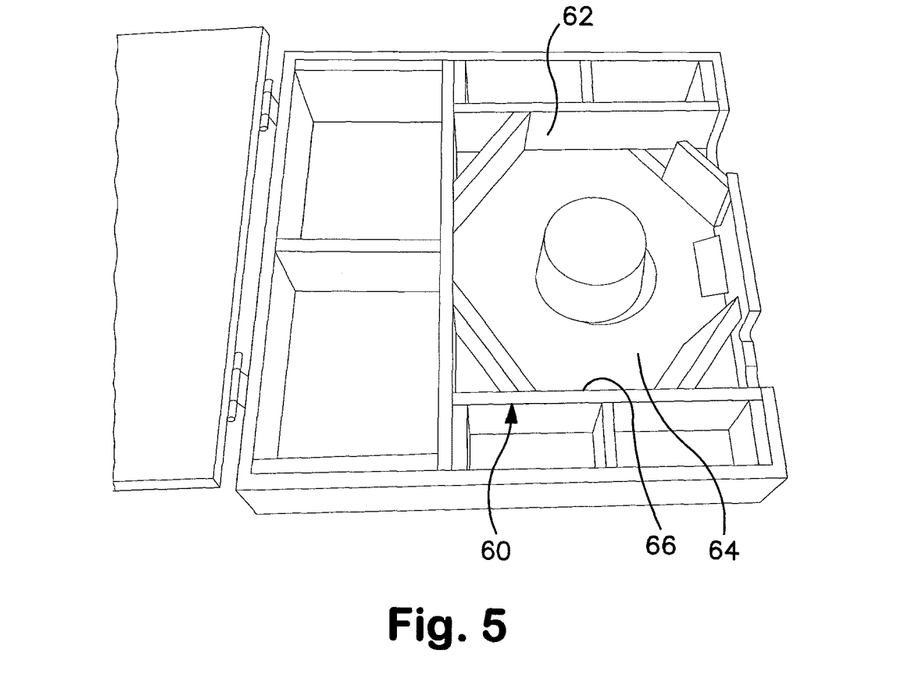
FIG. 5 is a perspective view of the interior of a mold used to apply the insulation to the insulated heat exchanger tube assembly of FIG. 1.
Figure 6:
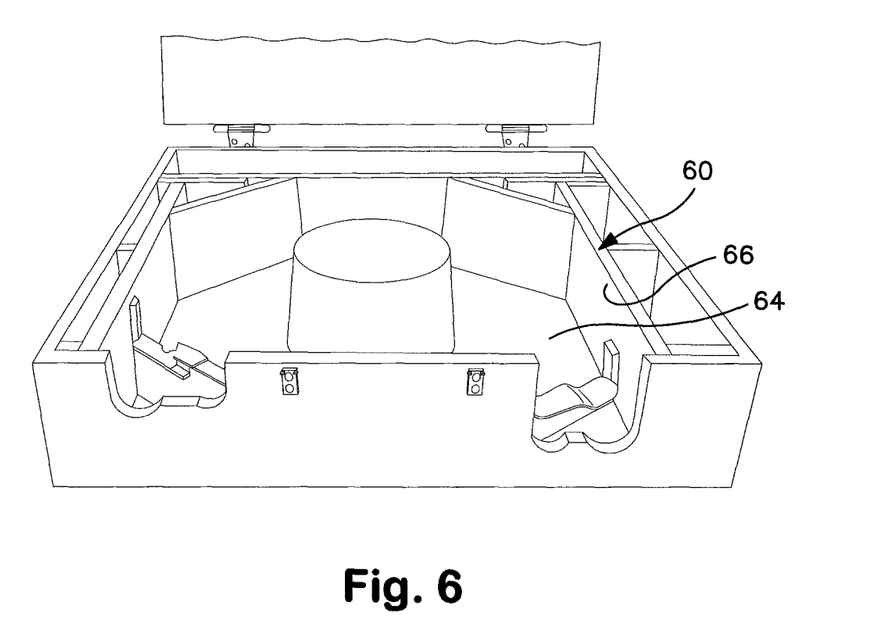
FIG. 6 shows the front exterior of a mold that can be used to apply the insulation to the insulated heat exchanger tube assembly of FIG. 1.

In order to form the assembly, the following process can be used. A film is placed along the walls of a mold 60, such as the mold shown in FIGS. 5-6. The mold 60 includes a cavity 62 defined by mold bottom 64, side wall 66, and a top 68. In the embodiment shown, the side wall 66 forms an octagonal shape. In embodiments, a vacuum mold is used. Suction is applied to the mold to hold the pre-made film in place. A coiled heat exchange tube 12 is placed in the mold and is held in the center of the mold using supports 70, 72, along the front wall of the mold. The supports 70, 72 can be configured to conform to the size and shape of the tubing material being insulated. The foam material is sprayed into the mold, over the film, as a liquid. After spraying, a piece of film is placed on the inner side of the mold top, the top is put on the mold and the foamed is cured. After curing is at least partially complete, the assembly is removed from the mold and cooled.

Figure 7:
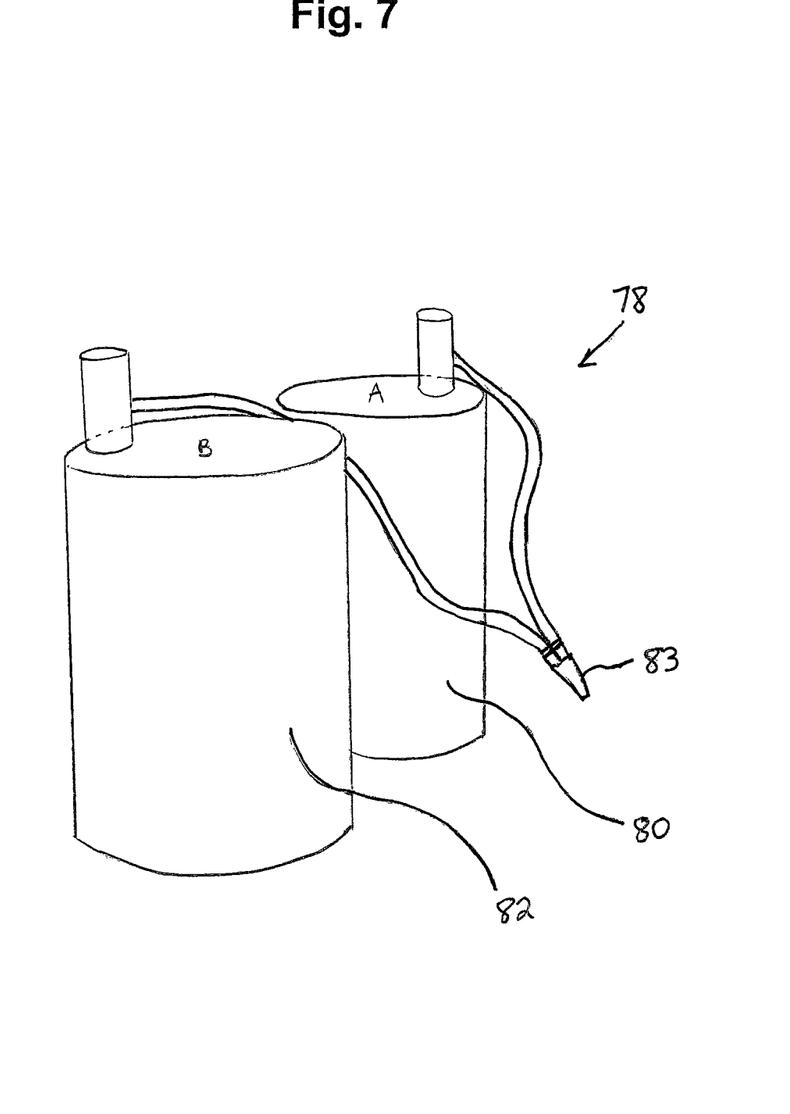
FIG. 7 shows a delivery system for the liquid foam for the insulated heat exchanger tube assembly of FIG. 1.

FIG. 7 shows a dispensing system 78 for a 2-part polyurethane foam coating in which the isocyanate is dispensed from a first tank 80 and the reacting resin, such as a polyol, is dispensed from a second tank 82. The two materials are mixed and then dispensed through a nozzle into the mold cavity 62.

FIG. 8 shows a HVAC unit 86 in which the insulated coil assembly 10 is mounted. Because the insulation is formed on the tube before the tube is installed, a separate post-installation wrapping step is not needed to apply insulation. In the configuration that is shown, the assembly is mounted on the bottom interior wall 88 of the heat exchanger, next to side wall 90, with the pipes extending outward from the assembly in a horizontal direction. In other embodiments, the pipes can extend vertically upward or downward, or the assembly can be set with a different side wall on the bottom inner wall of the heat exchanger such that the pipes extend upward or downward at an angle. The octagonal shape facilitates a universal configuration. The heat exchanger dimensions can be configured to receive an insulated tube assembly having particularly defined dimensions. FIG. 9. shows a HVAC unit 92 with two insulated heat exchanger tube assemblies 10 mounted side-by-side in a space-efficient manner.

Figure 10:
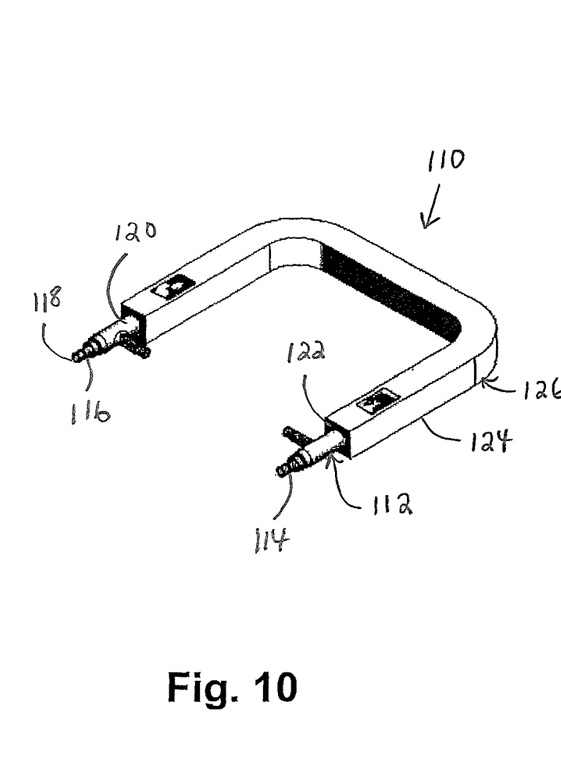
FIG. 10 is a perspective view of an insulated heat exchanger tube assembly in accordance with a second embodiment.

Referring next to FIG. 10, a perspective view of a second embodiment of an insulated heat exchanger tube assembly is shown and is designated as 110. The assembly 110 includes a U-shaped tube 112 having a first end 114 and a second end 116. In the embodiment shown in FIG. 10, the U-shaped tube has a tube-in-tube configuration with an inner tube 118 and an outer tube 120. However, a single U-shaped tube also can be used in accordance with embodiments described herein. The tube 112 is surrounded by an insulation portion 122. A film portion 124 surrounds the insulation portion 122. The insulating portion 122 and the film portion 124 together form an insulating housing 126.

FIG. 11 shows the insulated heat exchanger tube assembly 110 of FIG. 10 installed in a HVAC unit 186 on the bottom wall 188 next to an insulated heat exchanger assembly that contains a coiled tube.

It will be appreciated that features disclosed above and other features and functions, or alternatives thereof, may be desirably combined into many other different systems or applications. Furthermore, currently unforeseen or unanticipated alternatives, modifications, variations or improvements therein may be subsequently made by those skilled in the art which are also intended to be encompassed by the following claims.

What is claimed is:

1. A heat exchanger tube assembly comprising:
   a heat exchanger tube having a first end portion, an opposite second end portion, and an intermediate portion comprising a plurality of adjacent coils, and
   a portable insulating housing comprising
      an insulating portion form-fitted around the intermediate coiled portion of the heat exchanger tube, with the first end portion and the second end portion being positioned outside the housing, the insulating portion comprising a polymeric foam that supports the plurality of adjacent coils of the intermediate portion in a fixed position, and a polymeric film surrounding and adhered to the insulating portion, wherein the insulating housing has an annular configuration with at least one flat side wall, opposite flat front and back walls, and an inner wall.

2. The heat exchanger tube assembly of claim 1, wherein the heat exchanger tube includes an inner tube disposed inside an outer tube.

3. The heat exchanger tube of claim 1, wherein the insulating portion comprises a polyurethane foam.

4. The heat exchanger tube assembly of claim 1, wherein the film comprises at least one of a thermoplastic and a thermoset material.

5. The heat exchanger tube assembly of claim 3, wherein the film comprises at least one of a thermoplastic and a thermoset material.

6. The heat exchanger tube assembly of claim 1, wherein the insulating portion is adhered to the heat exchanger tube.

7. The heat exchanger tube assembly of claim 3, wherein the insulating portion is adhered to the heat exchanger tube.

8. The heat exchanger tube assembly of claim 1, wherein the at least one flat side wall includes a bottom side wall configured for mounting on a horizontal surface in a heat exchanger.

9. The heat exchanger tube assembly of claim 1, wherein the insulating housing has an octagonal cross section.

10. The heat exchanger tube assembly of claim 1, wherein the insulating housing is configured to be vertically or horizontally stacked with other insulating housings.

11. The heat exchanger tube assembly of claim 1, wherein the insulating housing has a first side, and the first and second end portions of the heat exchanger tube extend outwardly from the first side.

12. The heat exchanger tube assembly of claim 2, wherein the at least one flat side wall includes a bottom side wall configured for mounting on a horizontal surface in a heat exchanger.

13. The heat exchanger tube assembly of claim 2, wherein the insulating housing has an octagonal cross section.

14. The heat exchanger tube assembly of claim 2, wherein the insulating housing is configured to be vertically or horizontally stacked with other insulating housings.

15. The heat exchanger tube assembly of claim 2, wherein the insulating housing has a first side, and the first and second end portions of the heat exchanger tube extend outwardly from the first side.

* * * * *